United States Patent
Guo

(10) Patent No.: US 9,552,186 B2
(45) Date of Patent: Jan. 24, 2017

(54) DATA PROCESSING METHOD AND ELECTRONIC DEVICE

(71) Applicants: Lenovo (Beijing) Limited, Beijing (CN); Beijing Lenovo Software Ltd., Beijing (CN)

(72) Inventor: Ping Guo, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 58 days.

(21) Appl. No.: 14/461,007

(22) Filed: Aug. 15, 2014

(65) Prior Publication Data

US 2015/0193185 A1 Jul. 9, 2015

(30) Foreign Application Priority Data

Jan. 9, 2014 (CN) .......................... 2014 1 0010593

(51) Int. Cl.
*G06F 3/14* (2006.01)
*G06F 3/0484* (2013.01)
(Continued)

(52) U.S. Cl.
CPC ........... *G06F 3/1431* (2013.01); *G06F 1/1639* (2013.01); *G06F 1/1647* (2013.01); *G06F 3/1438* (2013.01); *G06F 3/1462* (2013.01); *G09G 5/12* (2013.01); *H04M 1/72519* (2013.01); *H04M 1/72527* (2013.01); *G09G 2330/021* (2013.01); *G09G 2354/00* (2013.01); *G09G 2360/04* (2013.01); *G09G 2370/042* (2013.01);
(Continued)

(58) Field of Classification Search
CPC .... G06F 3/1431; G06F 3/1438; G06F 3/1454; G06F 3/1462; G06F 3/04842; G09G 2300/02; G09G 2300/026; G09G 5/12; G09G 2370/12; G09G 2370/16; G09G 2370/042; G09G 2360/04; G09G 2354/00; G09G 2330/021; H04M 1/72583; H04M 1/72519; H04M 1/72527; H04M 1/7253
See application file for complete search history.

(56) References Cited

U.S. PATENT DOCUMENTS 8,200,796 B1 * 6/2012 Margulis ............... G06F 3/1431
 709/217
8,458,370 B1 * 6/2013 Tsu ........................ G09G 5/006
 370/465

(Continued)

*Primary Examiner* — Amare Mengistu
*Assistant Examiner* — Jennifer Zubajlo
(74) *Attorney, Agent, or Firm* — Schwegman Lundberg & Woessner, P.A.

(57) ABSTRACT

A data processing method and an electronic device are disclosed. The method comprises: causing at least one display content displayed by the at least one input/output display unit respectively to be independent from each other, so that processing on one current input/output display unit only affects the display content of the current input/output display unit, but does not affect other input/output display unit(s); obtaining a user operation on the at least one display area; synchronizing a system message between the at least one input/output display unit in response to the user operation, so that consistent system service is obtained from the at least one input/output display unit, wherein the at least one display content are identical or not identical.

9 Claims, 10 Drawing Sheets

(51) Int. Cl.
*H04M 1/725* (2006.01)
*G09G 5/12* (2006.01)
*G06F 1/16* (2006.01)

(52) U.S. Cl.
CPC ..... *G09G 2370/12* (2013.01); *G09G 2370/16* (2013.01); *H04M 1/7253* (2013.01); *H04M 2250/16* (2013.01)

(56) References Cited

U.S. PATENT DOCUMENTS

| | | | | |
|---|---|---|---|---|
| 2003/0206179 | A1* | 11/2003 | Deering | G06T 3/0081 345/589 |
| 2012/0194487 | A1* | 8/2012 | Roethig | G06F 3/1423 345/204 |
| 2013/0176237 | A1* | 7/2013 | Chu | G06F 3/1431 345/173 |
| 2013/0326397 | A1* | 12/2013 | Kim | G06F 3/0484 715/781 |
| 2015/0153991 | A1* | 6/2015 | Liang | G06F 3/1431 345/156 |
| 2015/0185839 | A1* | 7/2015 | Magi | G06F 3/014 345/173 |
| 2015/0332431 | A1* | 11/2015 | Tsuchida | H04N 5/23293 345/660 |
| 2015/0332432 | A1* | 11/2015 | Tsuchida | G09G 5/12 345/660 |

\* cited by examiner

DATA PROCESSING METHOD AND ELECTRONIC DEVICE

CROSS-REFERENCE TO RELATED APPLICATION(S)

This application claims priority to Chinese Application No. 201410010593.X, filed on Jan. 9, 2014, which is incorporated herein by reference in their entirety.

TECHNICAL FIELD

The present disclosure relates to communication technologies, and particularly, to a data processing method and an electronic device.

BACKGROUND

Current electronic devices, such as a desktop computer, a notebook, a smart phone etc. may support various display output approaches. The electronic device may also support a projection function and thus support an output approach for projection display.

During implementing technical solutions of embodiments of the present application, inventors of the present application have found at least technical problems in the prior art as follows:

In a current multi-display-output enabled scenario, one display output is the primary display output of the electronic device. The rest display outputs are only used as additive expansions to the primary display outputs of the electronic device, but are not display outputs that are parallel to the primary output and run independently. For example, the output content of HDMI and the like is a mirror of the output content of the primary screen of the electronic device. Typically, a secondary screen of a multi-screen mobile phone is only used as an expansion in size to the main-screen. In the related art, there is no effective solution to address this problem yet.

SUMMARY

Herein, it is an aim of the present invention to provide a data processing method and an electronic device, wherein a plurality of display outputs are operated independently and are provided in parallel, avoiding some of the display outputs being only used as additive expansions to one primary display output of the electronic device.

According to one aspect of the present invention, there is provided a data processing method which is applied in an electronic device. The electronic device comprises a projection unit, at least one collection unit, and at least one input/output display unit, the at least one input/output display unit having at least one display area respectively, the at least one display area including a first display area formed by projection of the projection unit. The method comprises steps of: causing at least one display content displayed by the at least one input/output display unit respectively to be independent from each other, so that processing on one current input/output display unit only affects the display content of the current input/output display unit, but does not affect other input/output display unit(s); obtaining a user operation on the at least one display area; performing synchronization of system messages between the at least one input/output display unit, in response to the user operation, so that consistent system services can be achieved from the at least one input/output display unit; wherein the at least one display content may be identical or not identical.

With the present invention, at least one display content displayed by at least one input/output display unit respectively is independent from each other, so that processing on the current input/output display unit may only affect the display content of the current input/output display unit, but may not affect other input/output display unit(s). Furthermore, although the display contents are operated independently and are outputted in parallel, consistent system services may be obtained from the at least one input/output display unit due to synchronization of system messages between the at least one input/output display unit.

DETAILED DESCRIPTION

Hereinafter, implementations of the technical solutions according to the present invention will be described in detail with reference to the drawings.

First Method Example

Figure 2:
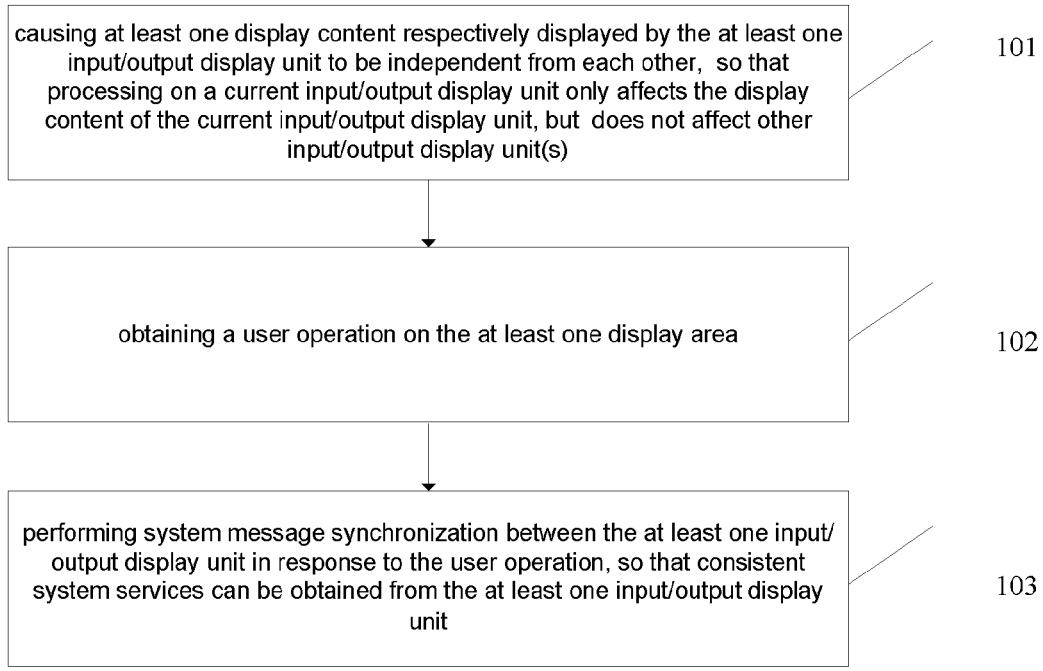
FIG. 2 is a schematic flowchart of an implementation of a method according to an embodiment of the present invention.

FIG. 2 shows steps of a data processing method according to an embodiment of the present invention, which can be applied in an electronic device. The electronic device comprises a projection unit, at least one collection unit, and at least one input/output display unit. The at least one input/output display unit has at least one display area respectively. The at least one display area includes a first display area formed by projection of the projection unit.

In step 101, at least one display content displayed by the at least one input/output display unit respectively is caused to be independent from each other, so that processing on one current input/output display unit only affects the display content of the current input/output display unit, but does not affect other input/output display unit(s).

In step 102, a user operation on the at least one display area is obtained.

In step 103, in response to the user operation, synchronization of system messages between the at least one input/output display unit is performed, so that consistent system service is achieved from the at least one input/output display unit.

Here, the at least one display content may be identical or not identical.

The embodiment of the present invention may be utilized to achieve beneficial effects as follows.

For example, because at least one display content displayed by at least one input/output display unit respectively may be independent from each other, the processing on the current input/output display unit may only affect the display content of the current input/output display unit, but may not affect other input/output display unit(s). Furthermore, although the display contents are operated independently and are outputted in parallel, consistent system services may be obtained from the at least one input/output display unit due to synchronization of system messages between the at least one input/output display unit. Herein, it should be noted that the at least one display content being identical or not identical may bring a benefit. That is, if respective input/output display units display an identical display content, it is convenient for a user to select one input/output display unit with the best output display effect for displaying this display content, according to display effects; and if respective input/output display units display different display contents, it is convenient for a user to select different display units for different display contents with different display effects, so as to guarantee that each of the display contents achieves its best display effect. At the same time, the user may operate a plurality of different display contents simultaneously, e.g. one input/output display unit being used for displaying a state of placing a call, while another input/output display unit being used for displaying a state of recording of call summary contents by handwriting.

In general, with the embodiment of the present invention, a plurality of display contents may be operated independently, and the display contents may be identical or not identical. Display parameters, such as resolution, of respective display contents may be different, so as to satisfy different display experiences. Synchronization of system messages may be performed between the plurality of display contents which are operated independently, in which after one current input/output display unit responds to a user operation, the response result (a change of the state of the display content on the current input/output display unit) will be notified to other input/output display unit(s) simultaneously. Thus, a user owning one single electronic device, such as one mobile phone, can have multi-output-display enabled experience, as if the user had owned a plurality of mobile phones.

Second Method Example

Figure 3:
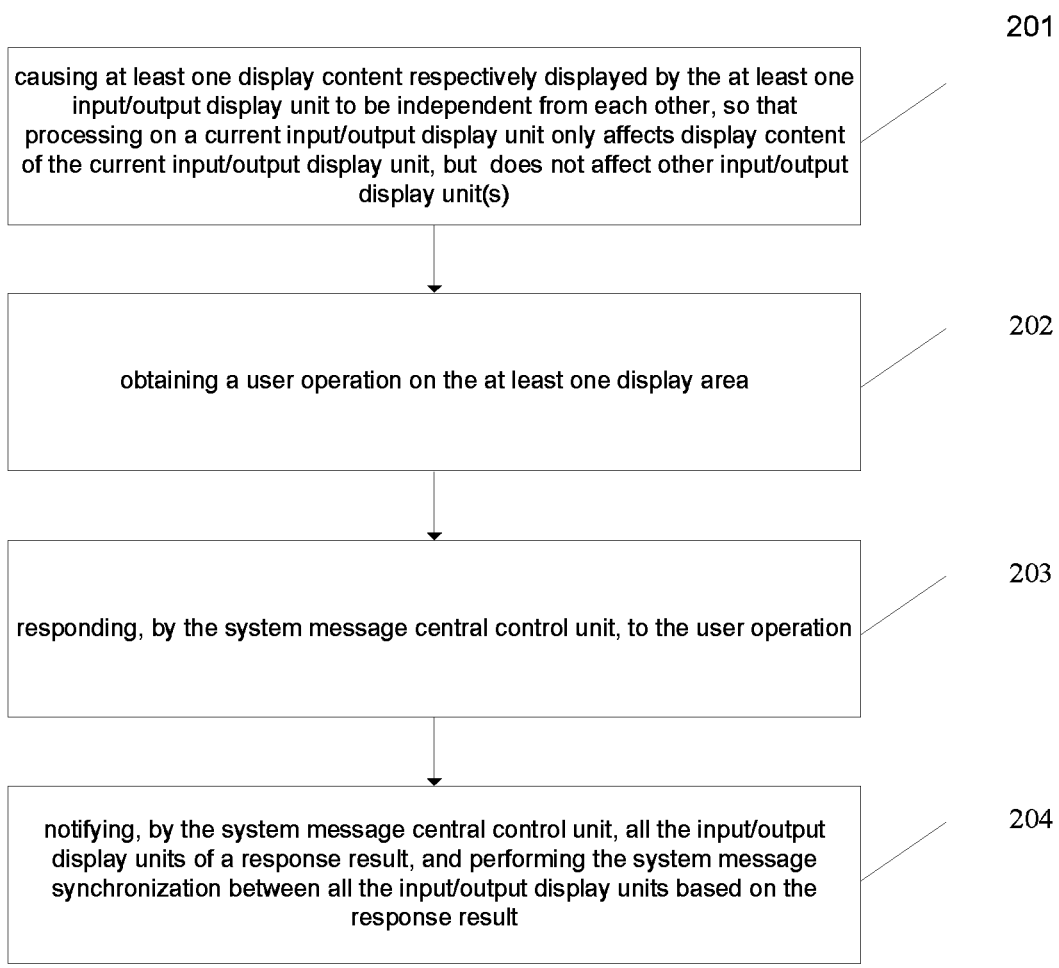
FIG. 3 is a schematic flowchart of an implementation of a method according to an embodiment of the present invention.

FIG. 3 shows steps of a data processing method of an embodiment according to the present invention which can be applied in an electronic device. The electronic device comprises a projection unit, at least one collection unit, and at least one input/output display unit. The at least one input/output display unit has at least one display area respectively. The at least one display area includes a first display area formed by projection of the projection unit.

The electronic device further comprises a system message central control unit. In step 201, at least one display content displayed by the at least one input/output display unit respectively is caused to be independent from each other, so that processing on one current input/output display unit only affects the display content of the current input/output display unit, but does not affect other input/output display unit(s).

In step 202, a user operation on the at least one display area is obtained.

In step 203, the system message central control unit makes a response to the user operation.

In step 204, a response result is notified by the system message central control unit to all the input/output display units, and synchronization of system messages is performed between all the input/output display units based on the response result.

Here, the at least one display content may be identical or not identical.

The embodiment of the present invention may be utilized to achieve beneficial effects as follows.

For example, because at least one display content displayed by at least one input/output display unit respectively may be independent from each other, the processing on the current input/output display unit may only affect the display content of the current input/output display unit, but may not affect other input/output display unit(s). Furthermore, although the display contents are operated independently and are outputted in parallel, consistent system services may be obtained from the at least one input/output display unit due to synchronization of system messages between the at least one input/output display unit. Herein, it should be noted that the at least one display content being identical or not identical may bring a benefit. That is, if respective input/output display units display an identical display content, it is convenient for a user to select one input/output display unit with the best output display effect for displaying this display content, according to display effects; and if respective input/output display units display different display contents, it is convenient for a user to select different display units for different display contents with different display effects, so as to guarantee that each of the display contents achieves its best display effect. At the same time, the user may operate a plurality of different display contents simultaneously, e.g. one input/output display unit being used for displaying a state of placing a call, while another input/output display unit being used for displaying a state of recording of call summary contents by handwriting.

The embodiment of the present invention utilizes a central control approach, which involves interactions between the system message central control unit and the input/output display units when a response is made. For example, the system message central control unit may perform unified control for system message synchronization between the input/output display units, so that the system message synchronization between all of the input/output display units are achieved according to the response result. Such a control approach is of a unified controlled synchronization mechanism, and all of the input/output display units are notified indifferently that all of the input/output display units must perform the system message synchronization.

Of course, instead of controlling all of the input/output display units to perform the system message synchronization, it is also possible that a few of the input/output display units are controlled to perform the system message synchronization.

In general, with the embodiment of the present invention, a plurality of display contents may be operated independently, and the display contents may be identical or not identical. Display parameters, such as resolution, of respective display contents may be different, so as to satisfy different display experiences. Synchronization of system messages may be performed between the plurality of display contents which are operated independently, in which after one current input/output display unit responds to a user operation, the response result (a change of the state of the display content on the current input/output display unit) will be notified to other input/output display unit(s) simultaneously. Thus, a user owning one single electronic device, such as one mobile phone, can have multi-output-display enabled experience, as if the user had owned a plurality of mobile phones.

Furthermore, the embodiment of the present invention is not limited in obtaining the user operation within one operation scenario (such as a scenario of making a call) defined by one display area, so as to trigger interactions for synchronizing messages. The embodiment of the present invention can be applied in a multi-screen scenario, wherein user operations are obtained in at least one display area, e.g. in two display areas which are used for displaying identical display contents, e.g. a caller ID. If a call is answered in a display area provided by one current input/output display unit, the change of the state of the call which has been answered may be synchronized to another display area provided by another input/output display unit via a system message, and then the another input/output display unit can stop displaying the caller ID. Not only the message is synchronized, but also the caller ID display in another display area is stopped. Turning off the caller ID display may also achieve an effect of saving power consumption of the electronic device and thus saving energy.

Of course, instead of displaying same display content, different display contents may also be displayed.

Third Method Example

Figure 4:
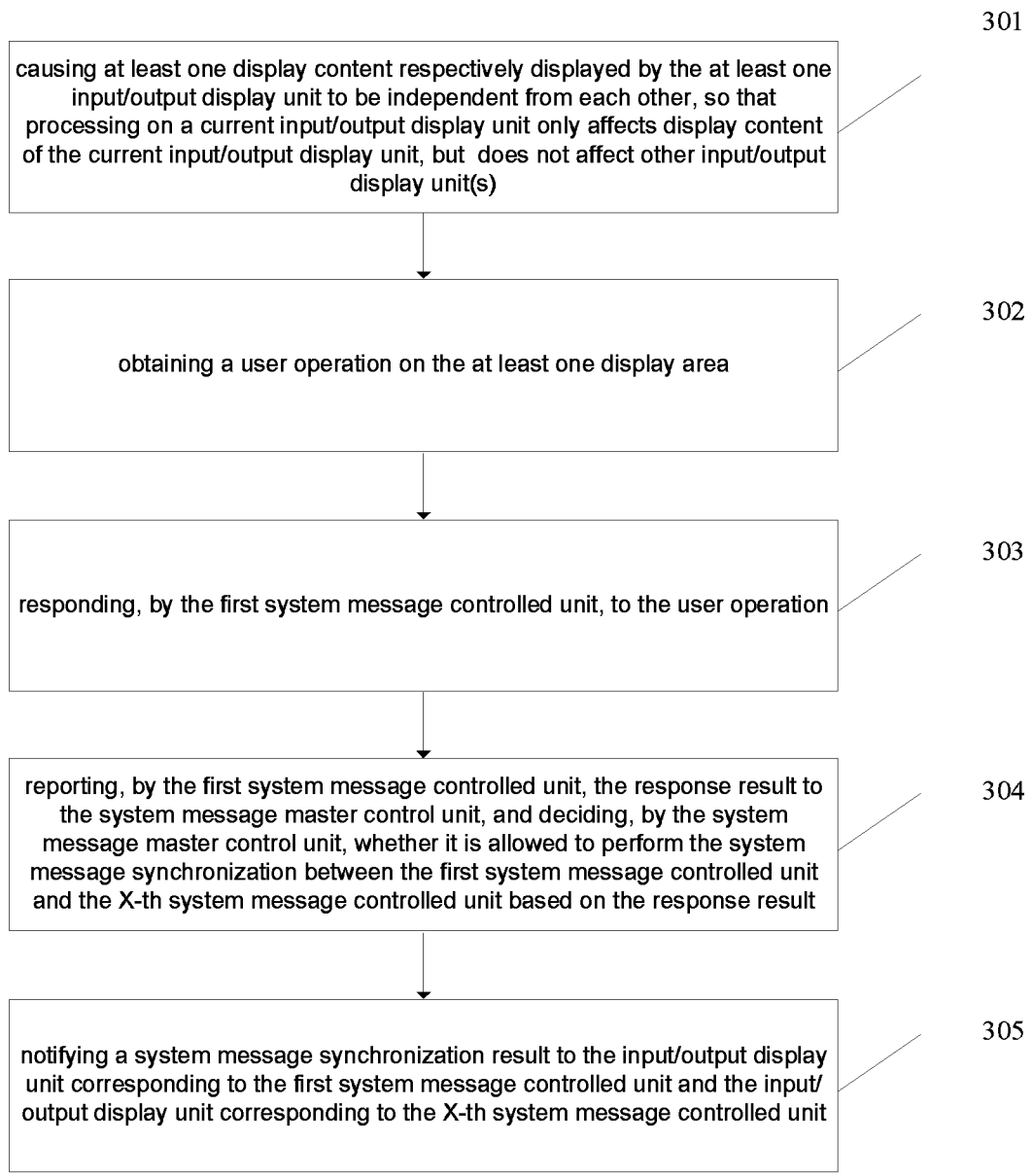
FIG. 4 is a schematic flowchart of an implementation of a method according to an embodiment of the present invention.

FIG. 4 shows steps of a data processing method of an embodiment according to the present invention which can be applied in an electronic device. The electronic device comprises a projection unit, at least one collection unit, and at least one input/output display unit. The at least one input/output display unit has at least one display area respectively. The at least one display area includes a first display area formed by projection of the projection unit.

The electronic device further comprises a system message master control unit and at least one system message controlled unit respectively corresponding to at least one input/output display unit. The at least one system message controlled unit comprises a first system message controlled unit and an X-th system message controlled unit, where X is a natural number greater than 1.

In step 301, at least one display content displayed by the at least one input/output display unit respectively is caused to be independent from each other, so that processing on one current input/output display unit only affects the display content of the current input/output display unit, but does not affect other input/output display unit(s).

In step 302, a user operation on the at least one display area is obtained.

In step 303, the first system message controlled unit makes a response to the user operation.

In step 304, a response result is reported by the first system message controlled unit, to the system message master control unit, and the system message master control unit decides whether it is allowed to perform the system message synchronization between the first system message controlled unit and the X-th system message controlled unit based on the response result.

In step 305, a system message synchronization result is notified to an input/output display unit corresponding to the first system message controlled unit and a input/output display unit corresponding to the X-th system message controlled unit.

Here, the at least one display content are identical or not identical.

The embodiment of the present invention may be utilized to achieve beneficial effects as follows.

For example, because at least one display content displayed by at least one input/output display unit respectively may be independent from each other, the processing on the current input/output display unit may only affect the display content of the current input/output display unit, but may not affect other input/output display unit(s). Furthermore, although the display contents are operated independently and are outputted in parallel, consistent system services may be obtained from the at least one input/output display unit due to synchronization of system messages between the at least one input/output display unit. Herein, it should be noted that the at least one display content being identical or not identical may bring a benefit. That is, if respective input/output display units display an identical display content, it is convenient for a user to select one input/output display unit with the best output display effect for displaying this display content, according to display effects; and if respective input/output display units display different display contents, it is convenient for a user to select different display units for different display contents with different display effects, so as to guarantee that each of the display contents achieves its best display effect. At the same time, the user may operate a plurality of different display contents simultaneously, e.g. one input/output display unit being used for displaying a state of placing a call, while another input/output display unit being used for displaying a state of recording of call summary contents by handwriting.

The embodiment of the present invention involves interactions among the system message master control unit, the system message controlled units and the input/output display units when a response is made. For example, a system message controlled unit (e.g. the first system message controlled unit) responds to an input/output display unit, and reports the response result to the system message master control unit. The system message master control unit selectively controls a plurality of system message controlled units (the first system message controlled unit, . . . , the X-th system message controlled unit, where X>1 and is a natural number) to perform system message synchronization. The system message master control unit or the system message controlled unit notifies corresponding input/output display units of the system message synchronization result. Then the corresponding input/output display units display the system message synchronization result. In such a way wherein the first system message controlled unit reports the response result, and the system message master control unit performs control on the basis of the response result, it is possible to selectively control several of the input/output display units to perform the system message synchronization.

In general, with the embodiment of the present invention, a plurality of display contents may be operated independently, and the display contents may be identical or not identical. Display parameters, such as resolution, of respective display contents may be different, so as to satisfy different display experiences. Synchronization of system messages may be performed between the plurality of display contents which are operated independently, in which after one current input/output display unit responds to a user operation, the response result (a change of the state of the display content on the current input/output display unit) will be notified to other input/output display unit(s) simultaneously. Thus, a user owning one single electronic device, such as one mobile phone, can have multi-output-display enabled experience, as if the user had owned a plurality of mobile phones.

The embodiment of the present invention uses a master/slave control approach, wherein the electronic device further comprises the system message master control unit ("Master") and respective system message controlled units ("Slave") corresponding to respective input/output display units. That is, the embodiment of the present invention uses a selective system message synchronization mechanism controlled in a "Main"/"Slave" manner. For example, the first system message controlled unit ("Slave 1") currently making a response may report its requirement to the system message master control unit ("Master") according to the response result. The system message master control unit ("Master") selectively performs the system message synchronization among selected system message controlled units, such as the first system message controlled unit ("Slave 1"), the second system message controlled unit ("Slave 2"), . . . , the X-th system message controlled unit ("Slave X") and etc., and notifies corresponding input/output display units to display the system message synchronization result, without performing the system message synchronization among all of the input/output display units.

Fourth Method Example

Figure 5:
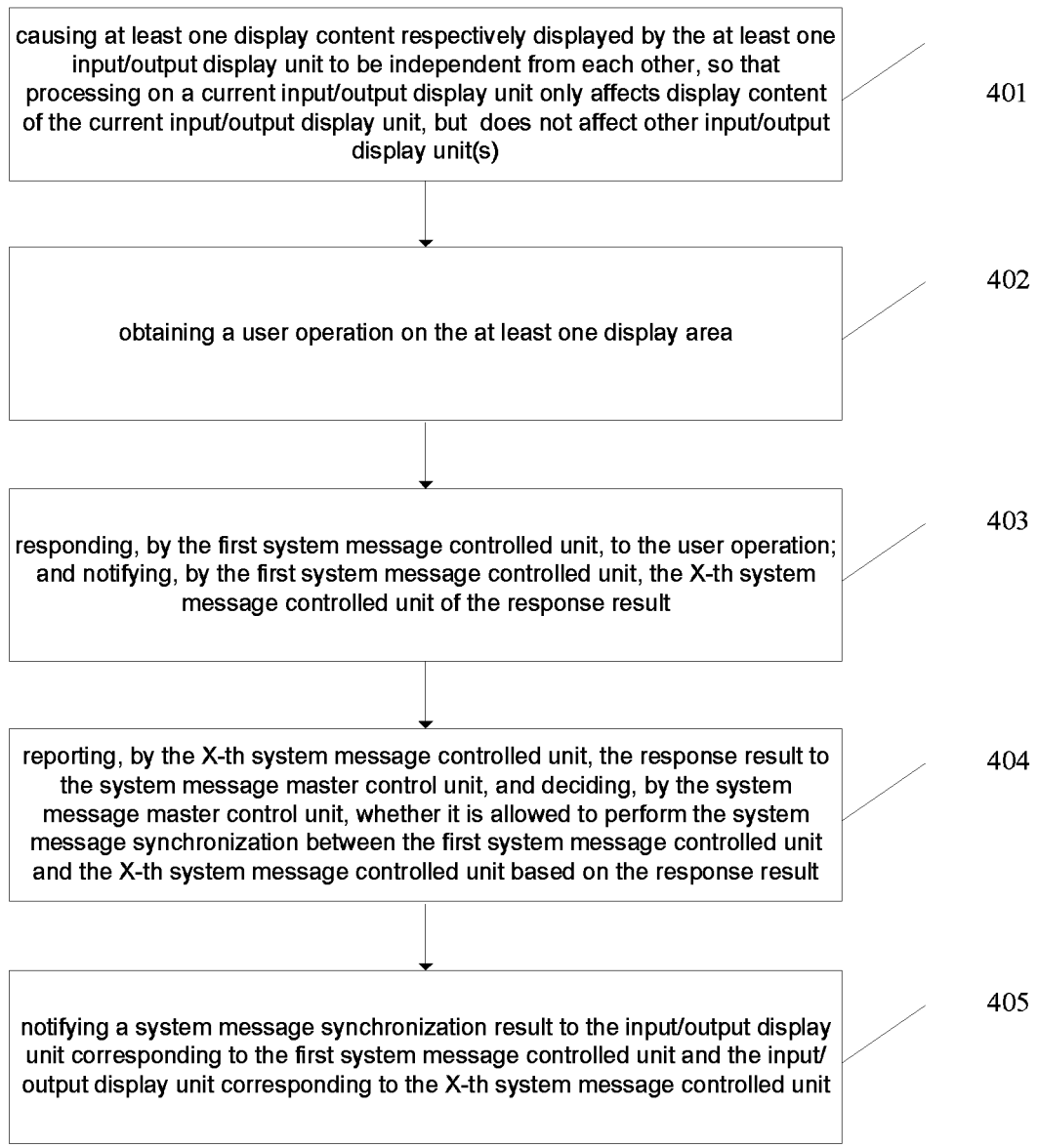
FIG. 5 is a schematic flowchart of an implementation of a method according to an embodiment of the present invention.

FIG. 5 shows steps of a data processing method of an embodiment according to the present invention which can be applied in an electronic device. The electronic device comprises a projection unit, at least one collection unit, and at least one input/output display unit. The at least one input/output display unit has at least one display area respectively. The at least one display area includes a first display area formed by projection of the projection unit.

The electronic device further comprises a system message master control unit and at least one system message controlled unit respectively corresponding to at least one input/output display unit. The at least one system message controlled unit comprises a first system message controlled unit and an X-th system message controlled unit, where X is a natural number greater than 1.

In step 401, at least one display content displayed by the at least one input/output display unit respectively is caused to be independent from each other, so that processing on one current input/output display unit only affects the display content of the current input/output display unit, but does not affect other input/output display unit(s).

In step 402, a user operation on the at least one display area is obtained.

In step 403, the first system message controlled unit makes a response to the user operation, and the first system message controlled unit notifies the X-th system message controlled unit of the response result.

In step 404, a response result is reported by the first system message controlled unit, to the system message master control unit, and the system message master control unit decides whether it is allowed to perform the system message synchronization between the first system message controlled unit and the X-th system message controlled unit based on the response result.

In step 405, a system message synchronization result is notified to an input/output display unit corresponding to the first system message controlled unit and an input/output display unit corresponding to the X-th system message controlled unit.

Here, the at least one display content are identical or not identical.

The embodiment of the present invention may be utilized to achieve beneficial effects as follows.

For example, because at least one display content displayed by at least one input/output display unit respectively may be independent from each other, the processing on the current input/output display unit may only affect the display content of the current input/output display unit, but may not affect other input/output display unit(s). Furthermore, although the display contents are operated independently and are outputted in parallel, consistent system services may be obtained from the at least one input/output display unit due to synchronization of system messages between the at least one input/output display unit. Herein, it should be noted that the at least one display content being identical or not identical may bring a benefit. That is, if respective input/output display units display an identical display content, it is convenient for a user to select one input/output display unit with the best output display effect for displaying this display content, according to display effects; and if respective input/output display units display different display contents, it is convenient for a user to select different display units for different display contents with different display effects, so as to guarantee that each of the display contents achieves its best display effect. At the same time, the user may operate a plurality of different display contents simultaneously, e.g. one input/output display unit being used for displaying a state of placing a call, while another input/output display unit being used for displaying a state of recording of call summary contents by handwriting.

The embodiment of the present invention involves interactions among the system message master control unit, the system message controlled units and the input/output display units when a response is made. For example, a system message controlled unit (e.g. the first system message controlled unit) responds to an input/output display unit, and reports the response result to the X-th system message controlled unit. The X-th system message controlled unit reports the response result to system message master control unit. The system message master control unit selectively controls a plurality of system message controlled units (the first system message controlled unit, . . . , the X-th system message controlled unit, where X>1 and is a natural number) to perform system message synchronization. The system message master control unit or the system message controlled unit notifies corresponding input/output display units of the system message synchronization result. Then the corresponding input/output display units display the system message synchronization result. In such a way wherein the first system message controlled unit notifies the response result to the X-th system message controlled unit, the X-th system message controlled unit reports the response result to system message master control unit, and the system message master control unit performs control on the basis of the response result, it is possible to selectively control several of the input/output display units to perform the system message synchronization.

In general, with the embodiment of the present invention, a plurality of display contents may be operated independently, and the display contents may be identical or not identical. Display parameters, such as resolution, of respective display contents may be different, so as to satisfy different display experiences. Synchronization of system messages may be performed between the plurality of display contents which are operated independently, in which after one current input/output display unit responds to a user operation, the response result (a change of the state of the display content on the current input/output display unit) will be notified to other input/output display unit(s) simultaneously. Thus, a user owning one single electronic device, such as one mobile phone, can have multi-output-display enabled experience, as if the user had owned a plurality of mobile phones.

The embodiment of the present invention uses a master/slave control approach in connection with a notification mechanism among the system message controlled units, wherein the electronic device further comprises the system message master control unit ("Master") and respective system message controlled units ("Slave") corresponding to respective input/output display units. That is, the embodiment of the present invention uses a selective system message synchronization mechanism controlled in a "Main"/"Slave" manner. For example, there exists a message notification mechanism among respective system message controlled units, such as the first system message controlled unit ("Slave 1"), the second system message controlled unit ("Slave 2"), . . . , the X-th system message controlled unit ("Slave X") etc., in order to decide whether the system message synchronization is required. Since the system message master control unit ("Main") may allocate resource to respective system message controlled units, such as the first system message controlled unit ("Slave 1"), the second system message controlled unit ("Slave 2"), . . . , the X-th system message controlled unit ("Slave X") etc., the X-th system message controlled unit ("Slave X"), which is not the current responding unit, of course can report its requirement to the system message master control unit ("Master") if it may also know the system message via the message notification mechanism mentioned above. The system message master control unit ("Master") selectively performs the system message synchronization among selected system message controlled units, such as the first system message controlled unit ("Slave 1"), the second system message controlled unit ("Slave 2"), . . . , the X-th system message controlled unit ("Slave X") and etc., and notifies corresponding input/output display units to display the system message synchronization result, without performing the system message synchronization among all of the input/output display units.

The difference between the present method example of the present invention and the third method example lies in that: the subjects for reporting the response result are different. In the third method example, the first system message controlled unit currently responding to the user operation is the reporting subject; while in the present method example of the present invention, the first system message controlled unit currently responding to the user operation uses the message notification mechanism to notify the X-th system message controlled unit of the response result, and the X-th system message controlled unit is the reporting subject.

Furthermore, the embodiment of the present invention is not limited in obtaining the user operation within one operation scenario (such as a scenario of making a call) defined by one display area, so as to trigger interactions for synchronizing messages. The embodiment of the present invention can be applied in a multi-screen scenario, wherein user operations are obtained in at least one display area, e.g. in two display areas which are used for displaying identical display contents, e.g. a caller ID. If a call is answered in a display area provided by one current input/output display unit, the change of the state of the call which has been answered may be synchronized to another display area provided by another input/output display unit via a system message, and then the another input/output display unit can stop displaying the caller ID. Not only the message is synchronized, but also the caller ID display in another display area is stopped. Turning off the caller ID display may also achieve an effect of saving power consumption of the electronic device and thus saving energy.

Moreover, in the scenario with two display areas for displaying different display contents (e.g. one for making a call, and the other for entering text record), a user operation is obtained e.g. in any one of display areas for making a calling and for entering text record, which will trigger the interactions for the message synchronization. There is a need for text recording during a call. Thus, the display area provided by one current input/output display unit is used for displaying the call, and the other display area provided by the other input/output display unit is used for displaying text and the like which are required to be recorded during the call. The two input/output display units may also exchange system messages, and thus if a user operation of ending a call is obtained by one input/output display unit, the text recording performed by the other input/output display unit will end too.

Based on the first to fourth method examples as described above, in a preferred implementation of the present invention, the at least one display content may comprise the display contents belonging to a same APP application. That is, in addition that the above contents themselves may be identical or not identical, the display content may also belong to the same content or different content of a same APP application. For example, there is such a scenario wherein a same reading APP application displays different pages on different screens, i.e., one book is divided onto a plurality of screens for display, which is an extension to a single page on-screen display.

Based on the first to fourth method examples as described above, the at least one display content may comprise the display contents belonging to different APP applications. That is, in addition that the above contents themselves may be identical or not identical, the display contents may also belong to different APP applications and thus surely are different. For example, there is such a scenario wherein different input/output display units run different APP applications. Different APP applications require different display effects in terms of resolution and etc. For example, playing games, viewing videos requires high resolution, while short messaging/making a call just requires a relatively low resolution. Therefore, when responding to a system message synchronization, one input/output display unit that best matches the display effect requirement of a current user operation can be selected according to the determination on the user operation, so that a better user experience can be achieved.

It should be noted that the following description on examples of electronic device of the present invention and their advantageous technical effects is similar as those of the method as described above, and thus are not described in details. For technical details which are not disclosed in examples of the electronic device according to the present invention, please refer to the description on the examples of the method according to the present invention.

First Electronic Device Example

Figure 6:
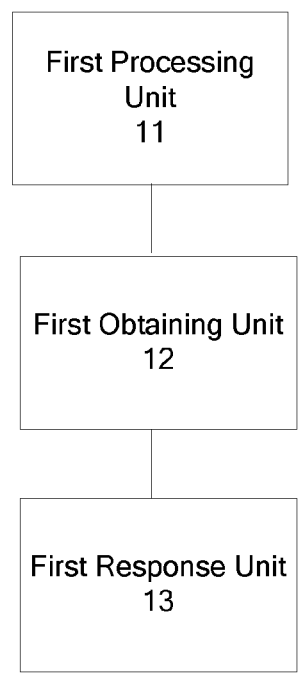
FIG. 6 is a schematic structure diagram of an electronic device according to an embodiment of the present invention.

FIG. 6 shows a schematic structure diagram of an electronic device according to an embodiment of the present invention. The electronic device comprises a projection unit, at least one collection unit, and at least one input/output display unit. The at least one input/output display unit has at least one display area respectively, and the at least one display area includes a first display area formed by projection of the projection unit.

As shown in FIG. 6, the electronic device further comprises a first processing unit 11, configured for causing at least one display content displayed by the at least one input/output display unit respectively to be independent from each other, so that processing on one current input/output display unit only affects the display content of the current input/output display unit, but does not affect other input/output display unit(s).

The electronic device further comprises a first obtaining unit 12, configured for obtaining a user operation on the at least one display area.

The electronic device further comprises a first response unit 13, configured for, in response to the user operation, performing system message synchronization between the at least one input/output display unit, so that consistent system services are obtained from the at least one input/output display unit, wherein the at least one display content may be identical or not identical.

Second Electronic Device Example

Figure 7:
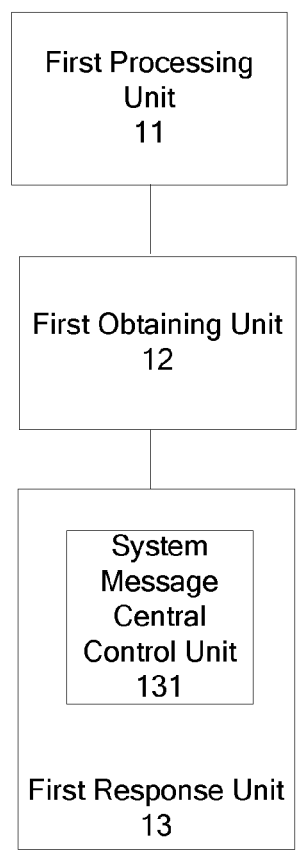
FIG. 7 is a schematic structure diagram of an electronic device according to an embodiment of the present invention.

FIG. 7 shows a schematic structure diagram of an electronic device according to an embodiment of the present invention. The electronic device comprises a projection unit, at least one collection unit, and at least one input/output display unit. The at least one input/output display unit has at least one display area respectively, and the at least one display area includes a first display area formed by projection of the projection unit.

As shown in FIG. 7, the electronic device further comprises a first processing unit 11, configured for causing at least one display content displayed by the at least one input/output display unit respectively to be independent from each other, so that processing on one current input/output display unit only affects the display content of the current input/output display unit, but does not affect other input/output display unit(s).

The electronic device further comprises a first obtaining unit 12, configured for obtaining a user operation on the at least one display area.

The electronic device further comprises a first response unit 13, configured for, in response to the user operation, performing a system message synchronization between the at least one input/output display unit, so that consistent system services are obtained from the at least one input/output display unit, wherein the at least one display content may be identical or not identical, The first response unit 13 comprises: a system message central control unit 131. The system message central control unit 131 is configured for responding to the user operation, notifying all the input/output display units of the response result, and performing the system message synchronization between all the input/output display units based on the response result.

Third Electronic Device Example

Figure 8:
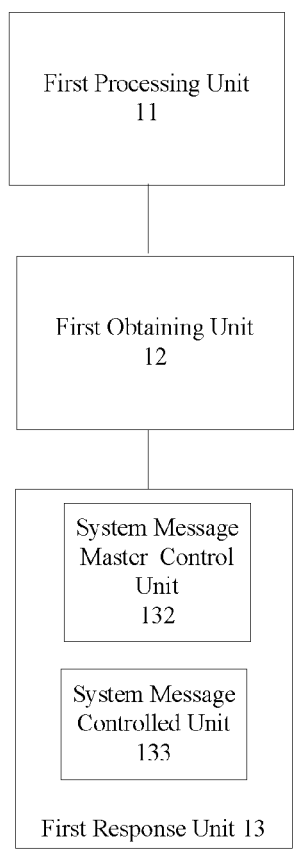
FIG. 8 is a schematic structure diagram of an electronic device according to an embodiment of the present invention.

FIG. 8 shows a schematic structure diagram of an electronic device according to an embodiment of the present invention. The electronic device comprises a projection unit, at least one collection unit, and at least one input/output display unit. The at least one input/output display unit has at least one display area respectively, and the at least one display area includes a first display area formed by projection of the projection unit.

As shown in FIG. 8, the electronic device further comprises a first processing unit 11, configured for causing at least one display content displayed by the at least one input/output display unit respectively to be independent from each other, so that processing on one current input/output display unit only affects the display content of the current input/output display unit, but does not affect other input/output display unit(s).

The electronic device further comprises a first obtaining unit 12, configured for obtaining a user operation on the at least one display area.

The electronic device further comprises a first response unit 13, configured for, in response to the user operation, performing a system message synchronization between the at least one input/output display unit, so that consistent system services are obtained from the at least one input/output display unit, wherein the at least one display content may be identical or not identical.

The first response unit 13 comprises a system message master control unit 132 and at least one system message controlled unit 133 respectively corresponding to at least one input/output display unit. The at least one system message controlled unit 133 comprises a first system message controlled unit and an X-th system message controlled unit, where X>1 and is a natural number.

The first system message controlled unit is configured for responding to the user operation, and reporting a response result to the system message master control unit. The system message master control unit is configured for: deciding whether it is allowed to perform the system message synchronization between the first system message controlled unit and the X-th system message controlled unit according to the response result, after the response result reported by the first system message controlled unit is received; and notifying a system message synchronization result to the input/output display unit corresponding to the first system message controlled unit and the input/output display unit corresponding to the X-th system message controlled unit.

Fourth Electronic Device Example

FIG. 8 shows a schematic structure diagram of an electronic device according to an embodiment of the present invention. The electronic device comprises a projection unit, at least one collection unit, and at least one input/output display unit. The at least one input/output display unit has at least one display area respectively, and the at least one display area includes a first display area formed by projection of the projection unit.

As shown in FIG. 8, the electronic device further comprises a first processing unit 11, configured for causing at least one display content displayed by the at least one input/output display unit respectively to be independent from each other, so that processing on one current input/output display unit only affects the display content of the current input/output display unit, but does not affect other input/output display unit(s).

The electronic device further comprises a first obtaining unit 12, configured for obtaining a user operation on the at least one display area.

The electronic device further comprises a first response unit 13, configured for, in response to the user operation, performing a system message synchronization between the at least one input/output display unit, so that consistent system services are obtained from the at least one input/output display unit, wherein the at least one display content may be identical or not identical.

The first response unit 13 comprises a system message master control unit 132 and at least one system message controlled unit 133 respectively corresponding to at least one input/output display unit. The at least one system message controlled unit 133 comprises a first system message controlled unit and an X-th system message controlled unit, where X>1 and is a natural number.

The first system message controlled unit is configured for responding to the user operation, and notifying a response result to the X-th system message controlled unit. The system message master control unit is configured for: deciding whether it is allowed to perform the system message synchronization between the first system message controlled unit and the X-th system message controlled unit according to the response result, after the response result reported by the X-th system message controlled unit is received; and notifying a system message synchronization result to the input/output display unit corresponding to the first system message controlled unit and the input/output display unit corresponding to the X-th system message controlled unit.

Based on the first to fourth examples of the electronic device as described above, in a preferred implementation of the present invention, the at least one display content may comprise the display contents belonging to a same APP application. That is, in addition that the above contents themselves may be identical or not identical, the display content may also belong to the same content or different content of a same APP application. For example, there is such a scenario wherein a same reading APP application displays different pages on different screens, i.e., one book is divided onto a plurality of screens for display, which is an extension to a single page on-screen display.

Based on the first to fourth examples of the electronic device as described above, the at least one display content may comprise the display contents belonging to different APP applications. That is, in addition that the above contents themselves may be identical or not identical, the display contents may also belong to different APP applications and thus surely are different. For example, there is such a scenario wherein different input/output display units run different APP applications. Different APP applications require different display effects in terms of resolution and etc. For example, playing games, viewing videos requires high resolution, while short messaging/making a call just requires a relatively low resolution. Therefore, when responding to a system message synchronization, one input/output display unit that best matches the display effect requirement of a current user operation can be selected according to the determination on the user operation, so that a better user experience can be achieved.

Annotations related to expressions in FIGS. 1 and 9-11 are shown as follows:

SystemMessages (i.e. A phone call in): a system message platform, e.g. a scenario in which a call is answered in presence of a multi-screen with a plurality of input/output display units;

LCD: Liquid Crystal Display, which may be a display screen of a mobile phone;

PICO: moveable mobile phone mini projector;

HDMI: High-Definition Multimedia Interface;

Pick up the phone: answering a call;

Don't know the phone status has changed: a scenario of not being aware of answering a call in presence of a multi-screen with a plurality of input/output display units;

Pick up the phone and sync the message to all display output: answering a call and notifying all of the input/output display units;

Process the message of phone: processing a message;

APPLICATIONS: upper layer applications;

Home: main function application of an upper layer;

Contacts: contact application of an upper layer;

Phone: calling application of an upper layer;

Browser: browser application of an upper layer;

APPLICATIONS FRAMEWORK: upper layer application framework;

Activity Manager: application program window management;

Window Manager: Microsoft management;

Content Providers: data sharing;

View System: a view system;

Notification Manager: notification management;

Package Manager: packaging management;

Telephony Manager: calling management;

Resource Manager: resource management;

Location Manager: locating management;

XMPP Service: XMPP service is a XML-based protocol, which inherits development of flexibility in a XML environment;

LIBRARIES: a function library layer;

Surface Manager: plotting surface management, which is a module in a function library layer under the framework in a user space for taking charge of displaying relevance, and may take charge of managing interactions between display and access operations when the system runs a plurality of application programs simultaneously;

Media Framework: a media framework;

SQ Lite: a database editor;

Open GLIES: a subset of 3D graph APIs, which is designed for an embedded device such as a mobile phone, a PDA and a game player;

Free Type: Free Type library is a fully free (open source), high quality and portable font engine for providing a unified interface for accessing files in a plurality of font formats;

Web Kit: an open source browser engine;

SGL: a built-in 2D graph engine 3D libraries, which is implemented based on OpenGL ES 1.0 APIs;

SSL: Secure Socket Layer, which is a communication protocol for Internet communication;

Libc: an ANSIC function library under Linux;

ANDROID RUNTIME: an Android runtime library;

Core Libraries: Core Libraries;

Dalvik Virtual Machine: a Dalvik virtual machine, which is an element contained in the Android runtime and providing a runtime environment for all of the applications as a like-Java virtual machine;

LINUX KERNEL: a Linux kernel layer;

Display Driver: a display driver;

Camera Driver: a camera driver;

Bluetooth Driver: a Bluetooth driver;

M-Systems Driver: a M-System driver for a mobile storage technique;

Binder (IPC) Driver: a Binder inter-process communication driver, a Binder operation being similar with a thread migration;

USB Driver: a USB driver;

Keypad Driver: a keypad driver;

WiFi Driver: a wireless driver;

Audio Drivers: audio drivers;

Power Management: power management;

SystemMessageSync: a system message synchronization platform;

Notification Manager 1-4: system message synchronization management 1-4;

GUI: Graphic User Interface.

Hereinafter, an embodiment of the present invention will be illustratively described in an application scenario.

A multi-screen application scenario is illustrated as follows. In a case that there are more and more display output approaches supported by an electronic device such as a smart mobile phone device, the display output approaches of the smart mobile phone available from the current market may include HDMI, WiFi display, Pico projection and multiple screens etc., besides the conventional LCD display screen. However, the development of the output content technology for the current smart mobile phone is straggling, which is in contradiction to various types of display contents. The output content, of HDMI, PICO, and the like on the market utilizes a mirror of the output content of the main screen, and thus the secondary screen of the multi-screen mobile phone is only used as an expansion in size to the main-screen. Such a situation has become a barrier for the smart mobile phone to evolve to a flexible smart mobile terminal. The embodiment of the present invention is a scheme for implementing multiple sets of independent display outputs on the conventional smart mobile phone system, sufficiently utilizing various display methods on the mobile phone so that one mobile phone may achieve usage experiences similar as those provided by multiple mobile phones, whereby increasing computing capability of the smart mobile phone may be sufficiently exerted and usage efficiency may be improved, and the user may have a more novel usage experience and a more flexible usage approach. By a simple changing of the system architecture of the current smart mobile phone, output control for multiple sets of display contents in parallel can be realized in the system. Therefore, various display means of the mobile phone may be utilized conveniently and flexibly, so as to output different display contents. Different output contents bring, to the user, the experience as if in the case where the user uses several different mobile phone devices. The user may run different applications in different display outputs, perform different operations, and may select, according to the user requirement, some content which is most suitable for the output device, in order to obtain the best experience.

Figure 1:
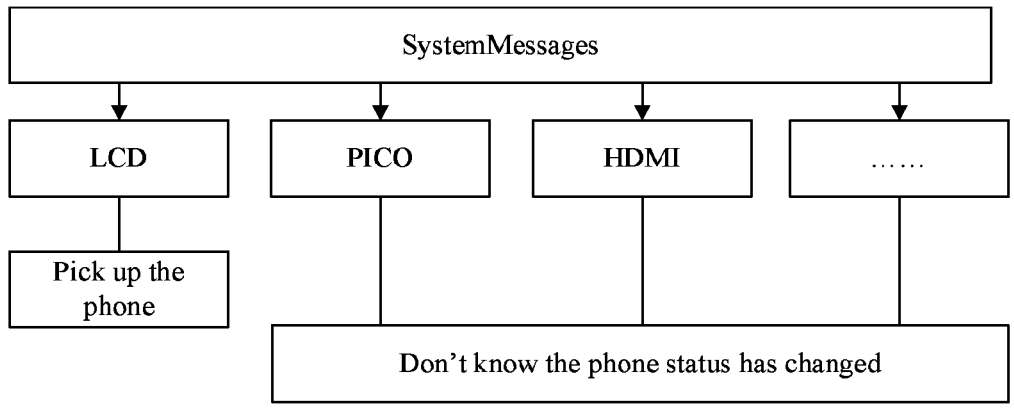
FIG. 1 is a schematic diagram of an application scenario in the prior art.

An example of answering the call is illustrated for the above scenario. In a current multi-display-output enabled scenario, one display output is the primary display output of the electronic device. The rest display outputs are only used as additive expansions to the primary display outputs of the electronic device, but are not display outputs that are parallel to the primary output and run independently. For example, the output content of HDMI and the like is a mirror of the output content of the primary screen of the electronic device. Typically, a secondary screen of a multi-screen mobile phone is only used as an expansion in size to the main-screen. In the related art, there is no effective solution to address this problem yet. Even if the secondary screen may output in parallel with the main screen, the synchronization between them cannot be performed, as shown in FIG. 1. That is, since the improvement only consists in that the respective outputs of the multi-display system are used for independent content displays, they are not relevant to each other. However, the system runs on same hardware, and the system messages thereof may present independently at respective outputs. The processing at one of outputs may only affect this output, but may not be synchronized to the whole system. This would cause the system statuses not consistent with each other, and may lead to a problem of system being unstable.

Figure 9:
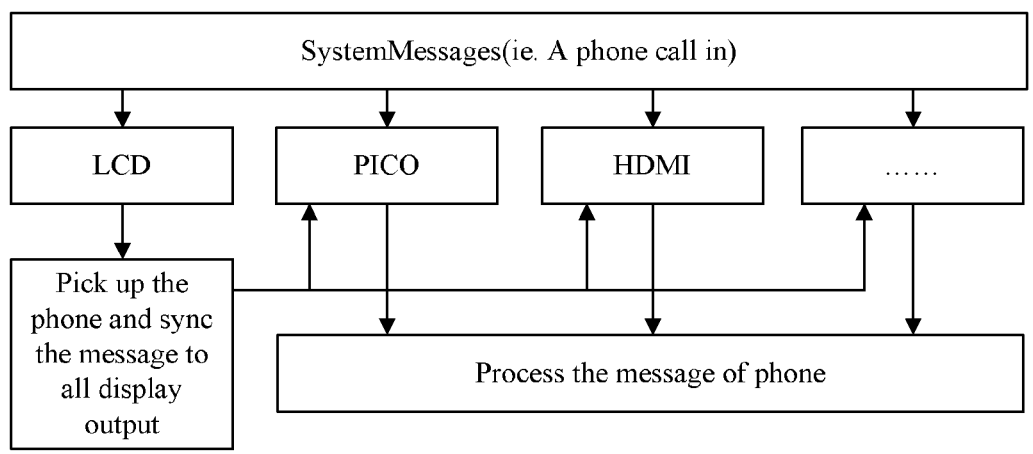
FIG. 9 is a schematic diagram of a scenario in which an embodiment according to the present invention is applied.

Since the embodiments of the present invention can implement system message synchronization control among multiple displays of a multi-display system, the multi-display system may perform the system message synchronization for individually independent contents. Thus, it is convenient for respective outputs to obtain unified, consistent system services. As shown in FIG. 9, if the plurality of screens, such as LCD, PICO, HDMI, display a same display content, i.e., the content of answering the call, the call is answered on the LCD screen, then a message indicating such an answering state change will be synchronized to all of the displays of the system when the phone is picked up at the LCD terminal, and thus the system messages of respective displays may be synchronized. In FIG. 9, the system messages are synchronized for the plurality of screens including PICO, HDMI etc. These screens can stop displaying and thus would avoid answering the call repeatedly. On the other hand, if there is no synchronization, these screens do not know that the status has been changed, and will answer the call repeatedly. Not only interference will occur, but also a waste of energy exists.

Figure 10:
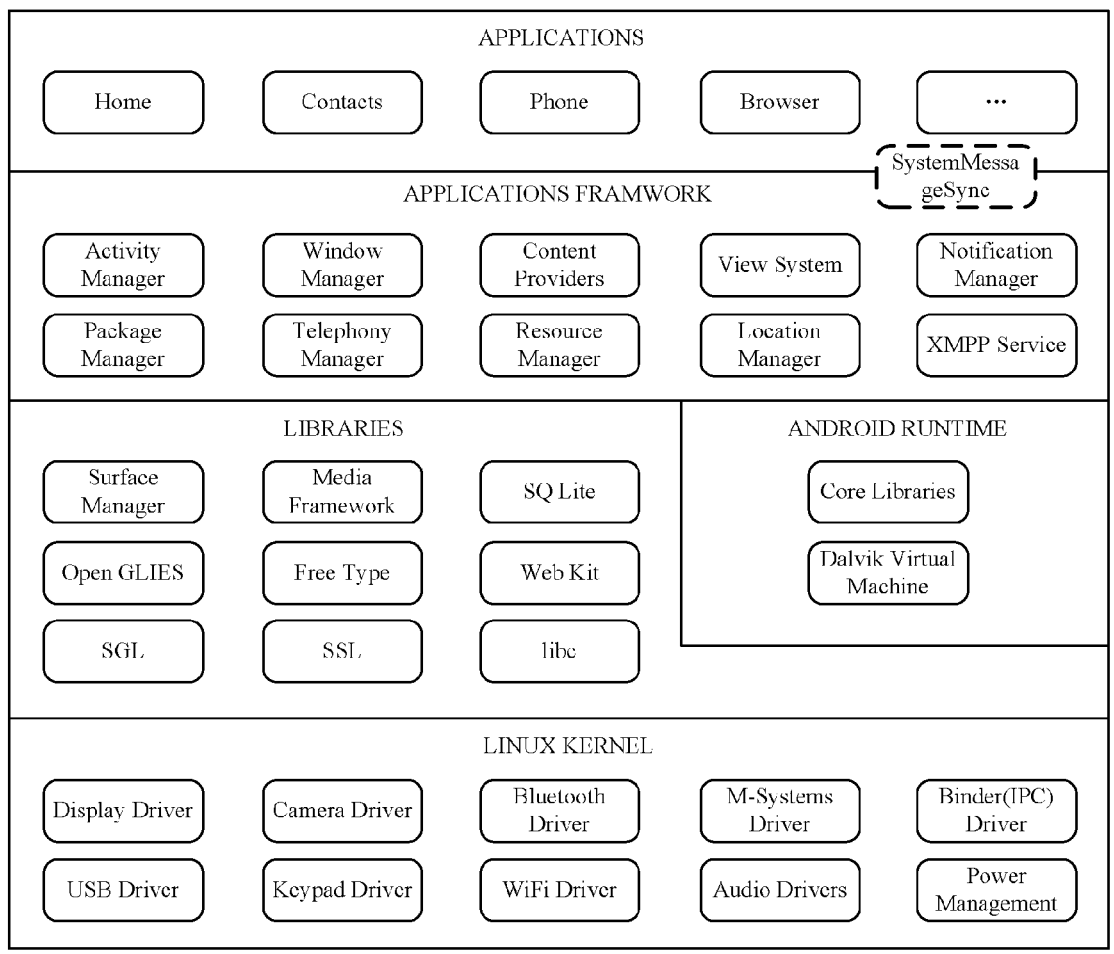
FIG. 10 is a schematic diagram of a scenario in which an embodiment according to the present invention is applied.

FIG. 10 shows a system architecture of Android. Like the operating system of Android, the system architecture of Android utilizes a hierarchical architecture. As seen from the architecture diagram of FIG. 10, there are four layers, which are an application layer (APPLICATIONS in FIG. 10), an application framework layer (APPLICATIONS FRAMWORK in FIG. 10), a system running library layer (LIBRARIES in FIG. 10) and a Linux Kernel layer (LINUX KERNEL in FIG. 10) from top to bottom.

In the embodiment of the present invention, the system message synchronization (SystemMessageSync) module is newly added in the multi-display system for specifically processing synchronization of all the system messages in the system. The SystemMessageSync module is an upper layer package of the Notification Manager module.

Figure 11:
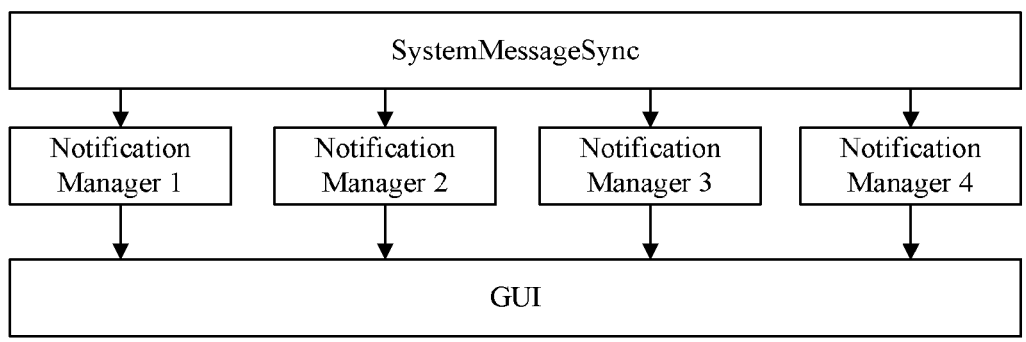
FIG. 11 is a schematic diagram of a scenario in which an embodiment according to the present invention is applied.

As shown in FIG. 11, there are e.g. four Notification Manager Modules, which are NotificationManager1-NotificationManager4 respectively mainly configured for performing system notification management on the single output. The SystemMessageSync module mentioned in the embodiment of the present invention is used for managing NotificationManager1-NotificationManager4, and synchronizing the system message to all of the outputs, in which the outputs may be input/output display units, the SystemMessageSync module may be a system message central control unit, and may also be a system message master control unit if cooperated with the Notification Manager module which here may be a system message controlled unit.

In the above multi-screen scenario where answering the call is taken as an example, from the perspective of the user, it may be implemented that when the multi-display system has an incoming call, the plurality of display outputs may all render display interfaces with the incoming call. When the user answers the call on one of the outputs, other display outputs may obtain the message and stop the incoming call display interface. From the perspective of the system design logic, it may be implemented that the electronic device, such as the smart mobile phone, has a kind of service program, this service program is an upper package of all the system message processing, which may synchronize the system messages of different display ends in the system.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It may be understood by the skilled in the art that all or parts of steps for implementing the above method embodiments may be implemented by hardware associated with program instructions. The above program may be stored in a computer readable storage medium, which when executed, may perform steps of the above method embodiments. The above storage medium may comprise various media which may store program codes, such as a movable storage device, a read-only memory, a random access memory, a magnetic disc or an optical disc.

Or, if the units of the present invention integrated as described above are implemented in a form of software functional modules and are sold or used as a separate product, they may also be stored in a computer readable storage medium. Based on such understanding, the technical solution of the embodiment in the present invention may substantially, or the part of the technical solution contributing to the prior art may be embodied in a form of a software product. The computer software product is stored in a storage medium including several instructions which may be used for causing one computer device (which may be a personal computer, a server, or a network device etc.) to perform all or parts of the methods of various embodiments in the present invention. The storage medium as described above may comprise various media which may store program codes, such as a movable storage device, a read-only memory, a random access memory, a magnetic disc or an optical disc.

As illustrated above, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. An electronic device comprising at least one collection unit, and at least two input/output display units, one of the at least two input/output display units being a projection unit, the at least two input/output display units having respective display areas;

the electronic device further comprising:
a first processing unit, configured for causing display contents displayed by the at least two input/output display units respectively to be independent from each other, so that processing on one current input/output display unit only affects the display content of said one input/output display unit, but does not affect other input/output display unit(s);
a first obtaining unit, configured for obtaining a user operation on the at least two input/output display units;
a first response unit, configured for performing system message synchronization between the at least two input/output display units in response to the user operation, so that consistent system services are obtained from the at least two input/output display units, and the resulting display content as a response of the one input/out display unit obtaining the user operation differs from those of other input/output display unit(s),
wherein the first response unit comprises a system message central control unit configured for responding to the user operation, notifying all the input/output display units of a response result, and performing the system message synchronization between all the input/output display units based on the response result, and
wherein the system message central control unit is added in a four-layer architecture comprising an application layer, an application framework layer, a system running library layer from top to bottom, and the a system message central control unit is located between the application layer and the application frame work layer.

2. The electronic device according to claim 1, wherein the first response unit comprises a system message master control unit and at least one system message controlled unit respectively corresponding to at least two input/output display units, the at least one system message controlled unit comprises a first system message controlled unit and a X-th system message controlled unit, where X>1 and is a natural number; and wherein the first system message controlled unit is configured for responding to the user operation and reporting a response result to the system message master control unit; and wherein the system message master control unit is configured for deciding whether it is allowed to perform the system message synchronization between the first system message controlled unit and the X-th system message controlled unit based on the response result, after the response result reported by the first system message controlled unit is received; and notifying a system message synchronization result to the input/output display unit corresponding to the first system message controlled unit and the input/output display unit corresponding to the X-th system message controlled unit.

3. The electronic device according to claim 2, wherein the display contents displayed by the at least two input/output display units comprise display contents belonging to a same APP application.

4. The electronic device according to claim 2, wherein the display contents displayed by the at least two input/output display units comprise display contents belonging to different APP applications.

5. The electronic device according to claim 1, wherein the system message central control unit comprises a system message master control unit and at least one system message controlled unit respectively corresponding to at least two input/output display units, the at least one system message controlled unit comprises a first system message controlled unit and a X-th system message controlled unit, where X>1 and is a natural number; and wherein the first system message controlled unit is configured for responding to the user operation and notifying the X-th system message controlled unit of a response result; and the system message master control unit is configured for deciding whether it is allowed to perform the system message synchronization between the first system message controlled unit and the X-th system message controlled unit based on the response result, after the response result reported by the X-th system message controlled unit is received; and notifying a system message synchronization result to the input/output display unit corresponding to the first system message controlled unit and the input/output display unit corresponding to the X-th system message controlled unit.

6. The electronic device according to claim 5, wherein the display contents displayed by the at least two input/output display units comprise display contents belonging to a same APP application.

7. The electronic device according to claim 5, wherein the display contents displayed by the at least two input/output display units comprise display contents belonging to different APP applications.

8. The electronic device according to claim 1, wherein the display contents displayed by the at least two input/output display units comprise display contents belonging to a same APP application.

9. The electronic device according to claim 1, wherein the display contents displayed by the at least two input/output display units comprise display contents belonging to different APP applications.

* * * * *